(12) United States Patent
Irisawa et al.

(10) Patent No.: US 7,931,825 B2
(45) Date of Patent: Apr. 26, 2011

(54) POLYMERIZABLE COMPOSITION

(75) Inventors: Masatomi Irisawa, Saitama (JP); Ken Matsumoto, Saitama (JP)

(73) Assignee: Adeka Corporation, Tokyo (JP)

( * ) Notice: Subject to any disclaimer, the term of this patent is extended or adjusted under 35 U.S.C. 154(b) by 81 days.

(21) Appl. No.: 12/519,474

(22) PCT Filed: Jan. 7, 2008

(86) PCT No.: PCT/JP2008/050033
§ 371 (c)(1),
(2), (4) Date: Jun. 16, 2009

(87) PCT Pub. No.: WO2008/096556
PCT Pub. Date: Aug. 14, 2008

(65) Prior Publication Data
US 2010/0090163 A1 Apr. 15, 2010

(30) Foreign Application Priority Data
Feb. 9, 2007 (JP) ................................. 2007-030050

(51) Int. Cl.
*C02K 19/00* (2006.01)
*C02K 19/06* (2006.01)
*C02K 19/52* (2006.01)
*G02F 1/1333* (2006.01)

(52) U.S. Cl. ........... 252/299.01; 252/299.6; 252/299.62; 252/299.63; 252/299.66; 428/1.1; 349/182; 349/183; 349/184; 349/185; 349/186; 349/86; 430/20; 526/326; 526/329.7; 526/284; 526/310; 522/104

(58) Field of Classification Search ............. 252/299.01, 252/299.6, 299.62–63, 299.66; 428/1.1; 349/182–186; 430/20; 526/326, 329.7, 284, 526/310; 522/104
See application file for complete search history.

(56) References Cited

U.S. PATENT DOCUMENTS
6,417,902 B1 7/2002 Greenfield et al.

FOREIGN PATENT DOCUMENTS

| JP | 3-119322 | 5/1991 |
|----|----------|--------|
| JP | 08-003111 | 1/1996 |
| JP | 9-105920 | 4/1997 |
| JP | 9-281480 | 10/1997 |
| JP | 10-087565 | 4/1998 |
| JP | 11-130729 | 5/1999 |
| JP | 2001-100045 | 4/2001 |
| JP | 2004-029062 | 1/2004 |
| JP | 2005-263789 | 9/2005 |
| JP | 2005-309255 | 11/2005 |
| JP | 2006-291212 | 10/2006 |
| JP | 2007-334062 | 12/2007 |
| WO | WO 2004/072699 | 8/2004 |
| WO | WO 2007/145247 | 12/2007 |

OTHER PUBLICATIONS

International Search Report, PCT/JP2008/050033, Apr. 8, 2008.

*Primary Examiner* — Geraldina Visconti
(74) *Attorney, Agent, or Firm* — Young & Thompson

(57) ABSTRACT

A polymerizable composition comprising a bifunctional (meth)acrylate compound represented by general formula (1) and a monofunctional (meth)acrylate compound having a nitrile group at the terminal thereof represented by general formula (2). The mass ratio of them (the former/the latter) is from 90/10 to 40/60.

20 Claims, No Drawings

POLYMERIZABLE COMPOSITION

TECHNICAL FIELD

This invention relates to a polymerizable composition containing a compound containing a specific monofunctional (meth)acrylate compound having a nitrile group at its terminal and a specific bifunctional (meth)acrylate compound having a side functional group. More particularly, it relates to a polymerizable composition that photopolymerizes at the (meth)acrylic groups of the compounds to provide a cured film with uniform film qualities and excellent optical characteristics.

BACKGROUND ART

Liquid crystal substances are applied to display media in which the reversible movement of liquid crystal molecules is made use of, such as display devices typically of TN or STN mode. Besides this application, liquid crystal substances have been studied for application to optically anisotropic elements, such as a retardation film, a polarizer, a polarizing prism, and various optical filters, taking advantage of their anisotropy in physical properties, such as refractive index, dielectric constant, and magnetic susceptibility, as well as their alignment properties.

Such an optically anisotropic element is obtained by, for example, uniformly aligning the molecules of a liquid crystal compound having a polymerizable functional group or a composition containing the liquid crystal compound into a liquid crystal phase and irradiating the compound or the composition being in the liquid crystal phase with energy rays, such as ultraviolet rays, to cause photopolymerization to form a polymer film in which the uniformly aligned state is semi-permanently fixed.

When the composition forming a polymer film has a high liquid crystal phase transition temperature, photopolymerization induced by energy rays may unintentionally invite thermal polymerization, which disturbs the uniform alignment of the liquid crystal molecules, making it difficult to fix a desired state of alignment. In order to facilitate temperature control during cure, a polymerizable composition showing a liquid crystal phase at or near room temperature is demanded.

The polymer film is obtained by polymerizing the polymerizable composition in the form of coating film applied to a substrate. If the composition contains a non-polymerizable compound, the resulting polymer film may have insufficient strength or contain residual stress-induced strain. Removing a non-polymerizable compound using, e.g., a solvent can result in a failure to retain film homogeneity and cause unevenness. To obtain a polymer film with a uniform thickness, it is therefore preferred to apply a polymerizable composition in the form of a solution in a solvent to a substrate. Hence, it is desirable for a liquid crystal compound or a composition containing it to have good solubility in a solvent.

Patent Document 1 discloses an optically anisotropic element obtained by polymerizing a nematic composition. The nematic composition has a problem that the film immediately after cure is uniform in thickness but poor in heat resistance and solvent resistance and, with time after cure, undergoes deformation or reduction in optical characteristics.

The present inventors have previously proposed compositions having excellent properties in terms of heat resistance, solvent resistance, solvent solubility, high glass transition temperature, and low liquid crystal phase transition temperature in Patent Document 2, Patent Document 3, Patent Document 4 and Patent Document 5.

In general, formation of a thick film from a polymerizable composition containing a liquid crystal compound encounters with difficulty in controlling molecular alignment of the liquid crystal compound, which can cause problems, such as reduction in transmittance and coloration. On the other hand, a thin polymer film having satisfactory molecular alignment over the entire area thereof can be obtained, but formation of a thin film has difficulty in thickness control, readily resulting in nonuniform surface condition or crystallization. Thin polymer films obtained from known compositions are thus unsatisfactory in physical properties and optical characteristics.

Patent Document 1: JP 8-3111A
Patent Document 2: JP 10-87565A
Patent Document 3: JP 11-130729A
Patent Document 4: JP 2005-263789A
Patent Document 5: JP 2005-309255A

DISCLOSURE OF THE INVENTION

Problem to be Solved by the Invention

Accordingly, an object of the present invention is to provide a composition that exhibits a liquid crystal phase at or near room temperature and has good solvent solubility and affords on curing a polymer film, the polymer film having heat resistance, well-controlled molecular alignment, and excellent optical characteristics, and even with a small thickness, sufficient optical characteristics and uniform film qualities.

Means for Solving the Problem

As a result of extensive investigations, the inventors of the present invention have accomplished the above object by the provision of a polymerizable composition containing a bifunctional (meth)acrylate compound represented by general formula (1) shown below and a monofunctional (meth) acrylate compound having a nitrile group at one terminal thereof represented by general formula (2) shown below at a mass ratio of the former to the latter of 90/10 to 40/60.

[Formula 1]

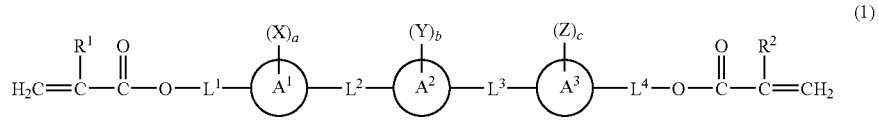

(1)

wherein $R^1$ and $R^2$ each independently represent a hydrogen atom or a methyl group; ring $A^1$, ring $A^2$, and ring $A^3$ each independently represent a benzene ring, a cyclohexane ring, a cyclohexene ring, a naphthalene ring, a decahydronaphthalene ring, a tetrahydronaphthalene ring, or a phenanthrene ring, the —CH= moiety of each of the rings being optionally displaced with —N= or the —CH$_2$— moiety of each of the rings being optionally displaced with —S— or —O—; X, Y, and Z each independently represent an optionally substituted alkyl group having 1 to 8 carbon atoms, an optionally substituted acyl group having 1 to 8 carbon atoms, an optionally substituted alkoxy group having 1 to 8 carbon atoms, a halogen atom, or a cyano group, provided that at least one of Y's represents a group composed of at least two atoms except a halogen atom; $L^1$, $L^2$, $L^3$, and $L^4$ each independently represent a single bond, —COO—, —OCO—, —$(CH_2)_p$—, —CH=CH—, —$(CH_2)_p$O—, —O$(CH_2)_p$—, —CH=CHCH$_2$O—, —OCH$_2$CH=CH—, —C≡C—, —$(CH_2)_p$COO—, —OCO$(CH_2)_p$—, —$(CH_2)_p$OCO—O—, —OCO—O$(CH_2)_p$—, —$(CH_2)_q$O$(CH_2)_r$O—, or —O$(CH_2)_q$O$(CH_2)_r$—; a, b, and c each represent the number of the substituents on the rings $A^1$, $A^2$, and $A^3$, respectively, and are each defined to be an integer of 2t+2 or fewer, wherein t is the number of the 6-membered rings making up the monocyclic or fused ring $A^1$, $A^2$, or $A^3$, provided that b is at least 1; each p independently represents an integer of 1 to 8; and q and r each independently represent an integer of 1 to 3.

[Formula 2]

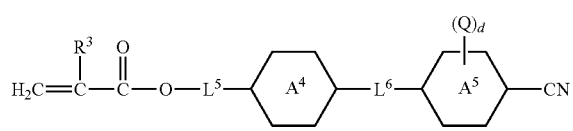

(2)

wherein $R^3$ represents a hydrogen atom or a methyl group; ring $A^4$ and ring $A^5$ each independently represent a benzene ring, a cyclohexane ring, or a naphthalene ring, the —CH= moiety of each of the rings being optionally displaced with —N= or the —CH$_2$— moiety of each of the rings being optionally displaced with —S— or —O—; each Q independently represents an optionally substituted alkyl group having 1 to 8 carbon atoms, an optionally substituted acyl group having 1 to 8 carbon atoms, an optionally substituted alkoxy group having 1 to 8 carbon atoms, a halogen atom, or a cyano group; $L^5$ and $L^6$ each independently represent —COO—, —OCO—, —$(CH_2)_p$—, —CH=CH—, —$(CH_2)_p$O—, —O$(CH_2)_p$—, —CH=CHCH$_2$O—, —OCH$_2$CH=CH—, —C≡C—, —$(CH_2)_p$COO—, —OCO$(CH_2)_p$—, —$(CH_2)_p$OCO—O—, —OCO—O$(CH_2)_p$—, —$(CH_2)_q$O$(CH_2)_r$O—, or —O$(CH_2)_q$O$(CH_2)_r$—; d represents the number of the substituents on the ring $A^5$ and is defined to be an integer of 2t+2 or fewer, wherein t is the number of the 6-membered rings making up the monocyclic or fused ring; each p independently represents an integer of 1 to 8; and q and r each represent an integer of 1 to 3.

The invention also provides preferred embodiments of the polymerizable composition, in which:

The polymerizable composition has a liquid crystal phase at 30° C. or lower.

The polymerizable composition further contains an optically active compound and develops a cholesteric liquid crystal phase.

The polymerizable composition further contains a radical polymerization initiator and a surfactant.

The invention also provides a polymer film obtained by photopolymerizing the composition while the composition is in a liquid crystal phase.

The invention also provides an optical film for display devices which is formed of the polymer film of the invention.

BEST MODE FOR CARRYING OUT THE INVENTION

The polymerizable composition of the invention and the polymer film obtained by photopolymerizing the composition will be described in detail based on their preferred embodiments.

Examples of the alkyl group having 1 to 8 carbon atoms as represented by X, Y, and Z in general formula (1) and Q in general formula (2) include methyl, chloromethyl, trifluoromethyl, cyanomethyl, ethyl, dichloroethyl, propyl, isopropyl, butyl, sec-butyl, tert-butyl, isobutyl, amyl, isoamyl, tert-amyl, hexyl, 2-hexyl, 3-hexyl, cyclohexyl, 1-methylcyclohexyl, heptyl, 2-heptyl, 3-heptyl, isoheptyl, tert-heptyl, n-octyl, isooctyl, tert-octyl, and 2-ethylhexyl. Examples of the acyl group having 1 to 8 carbon atoms as represented by X, Y, and Z in general formula (1) and Q in general formula (2) include formyl, acetyl, propionyl, butyloyl, valeroyl, and pivaloyl. Examples of the alkoxy group having 1 to 8 carbon atoms as represented by X, Y, and Z in general formula (1) and Q in general formula (2) include methyloxy, chloromethyloxy, trifluoromethyloxy, cyanomethyloxy, ethyloxy, dichloroethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, and 2-ethylhexyloxy. Examples of the halogen atom as represented by X, Y, and Z in general formula (1) and Q in general formula (2) include a fluorine atom and a chlorine atom. At least one of Y's in general formula (1) is a group having two or more atoms except a halogen atom bonded together. Specific examples of such a group include those listed as $Y^3$ in general formula (5) below.

The bifunctional (meth)acrylate compound represented by general formula (1) is exemplified by compounds represented by general formula (3) below. Of the compounds of general formula (3) preferred are those in which ring $A^1$ and ring $A^3$ are each a benzene ring or a naphthalene ring.

[Formula 3]

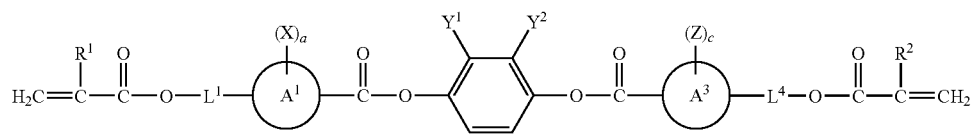

(3)

wherein $R^1$, $R^2$, $L^1$, $L^4$, $A^1$, $A^3$, X, Z, a, and c are as defined for general formula (1); and $Y^1$ and $Y^2$ each independently represent a hydrogen atom, an optionally substituted alkyl group having 1 to 8 carbon atoms, an optionally substituted acyl group having 1 to 8 carbon atoms, an optionally substituted alkoxy group having 1 to 8 carbon atoms, a halogen atom, or a cyano group, provided that at least one of $Y^1$ and $Y^2$ is a group composed of two or more atoms except a halogen atom bonded together.

The compounds of general formula (3) are exemplified by those represented by general formula (5). Specific examples of the compounds represented by general formula (5) include, but are not limited to, compounds of [formula 5] to [formula 7] shown below.

[Formula 4]

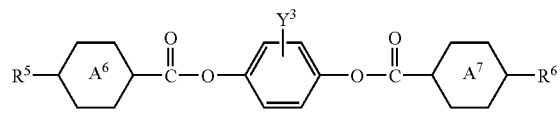

(5)

wherein $R^5$ and $R^6$ represent an atomic group selected from the group consisting of

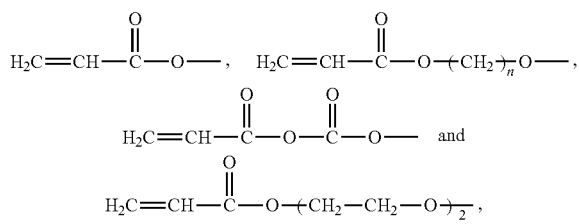

and may be the same or different from one another, wherein n represents an integer of 2 to 6;
$A^6$ and $A^7$ represents a benzene ring, a cyclohexane ring, or a naphthalene ring:
$Y^3$ represents an atomic group selected from the group consisting of

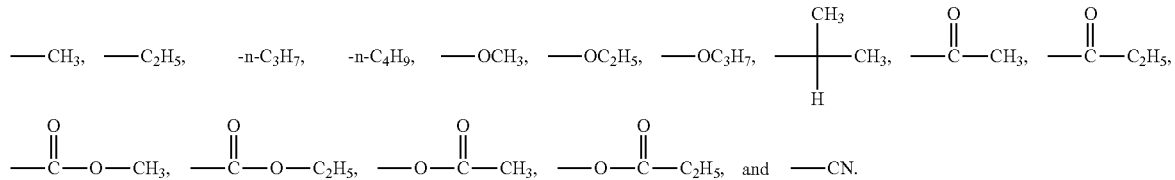

[Formula 5]

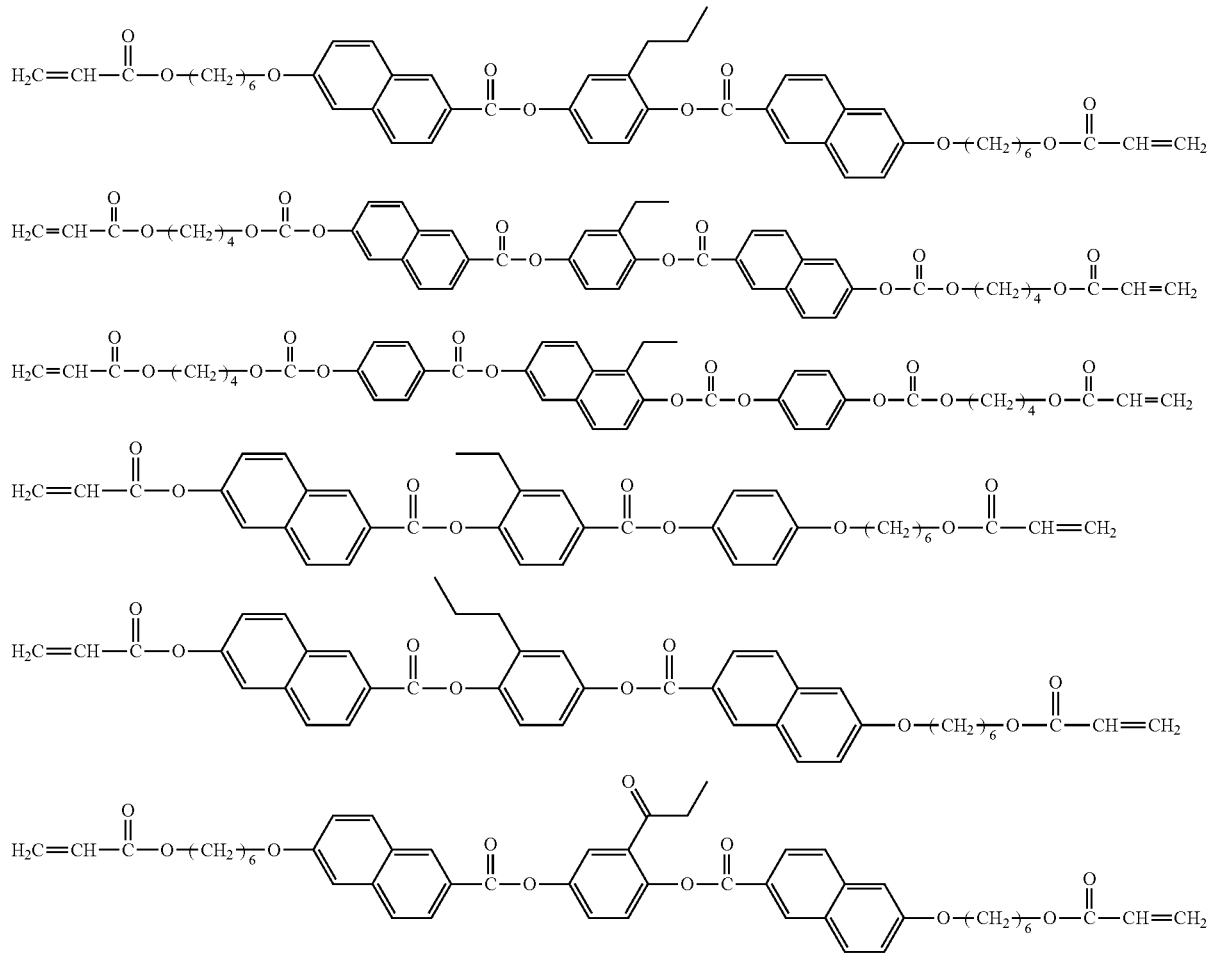

-continued
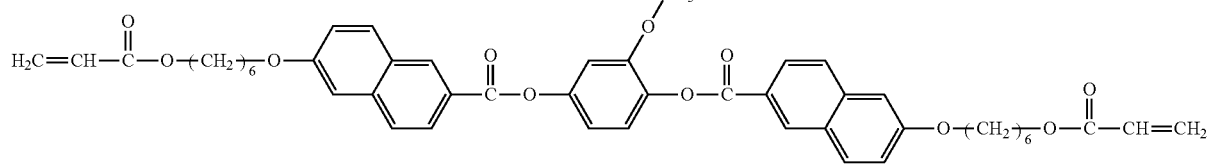
[Formula 6]
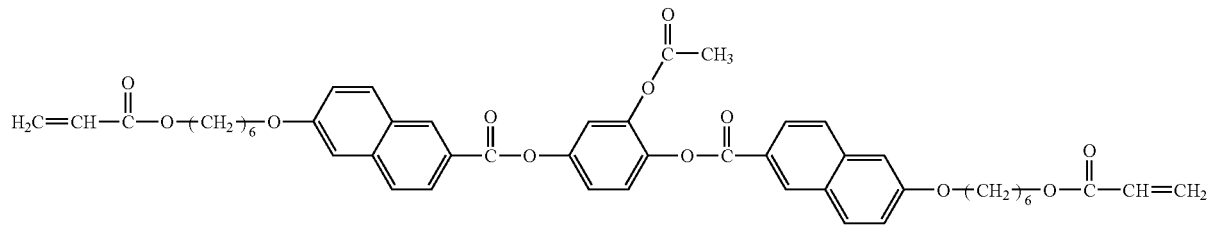
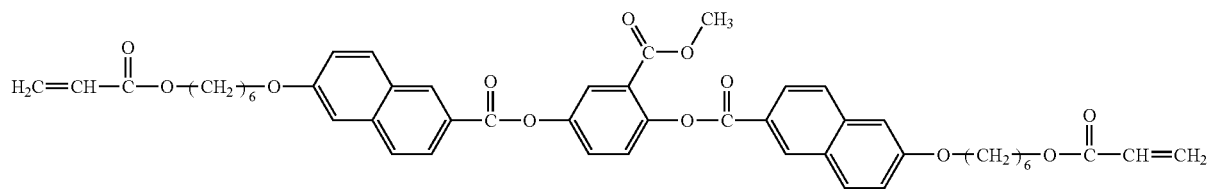
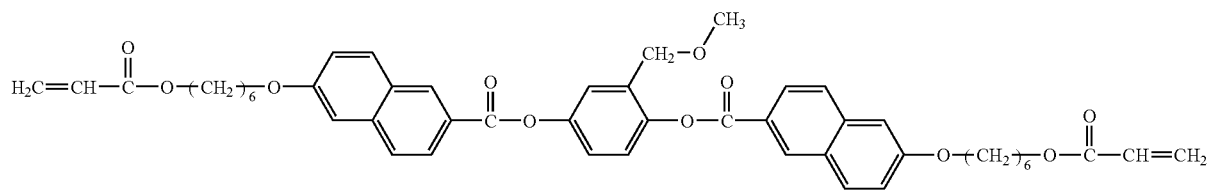
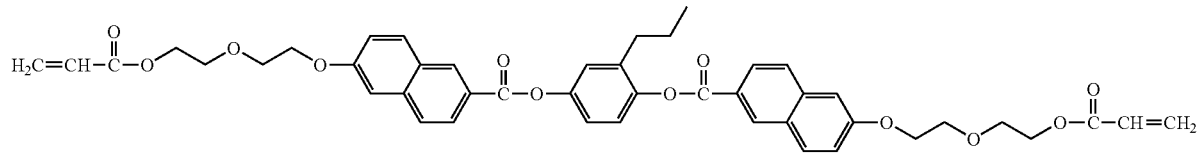
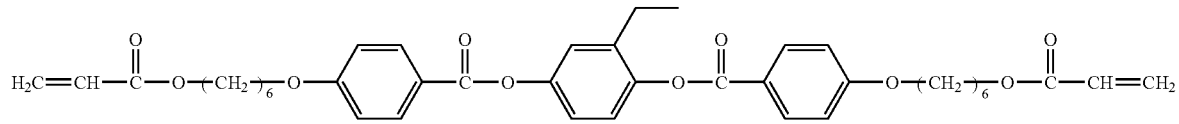
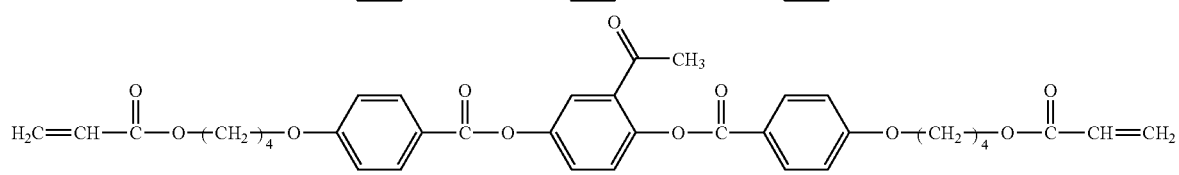
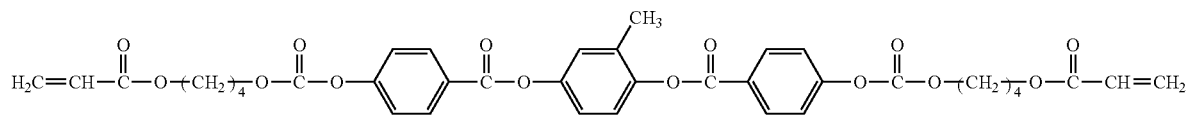
[Formula 7]
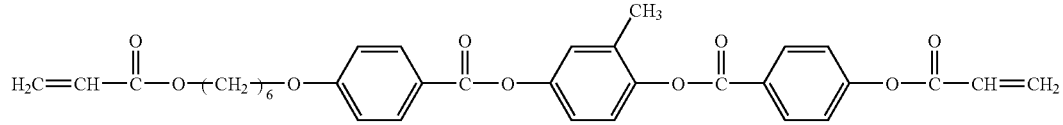
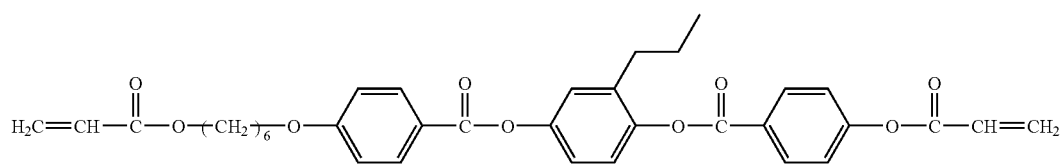

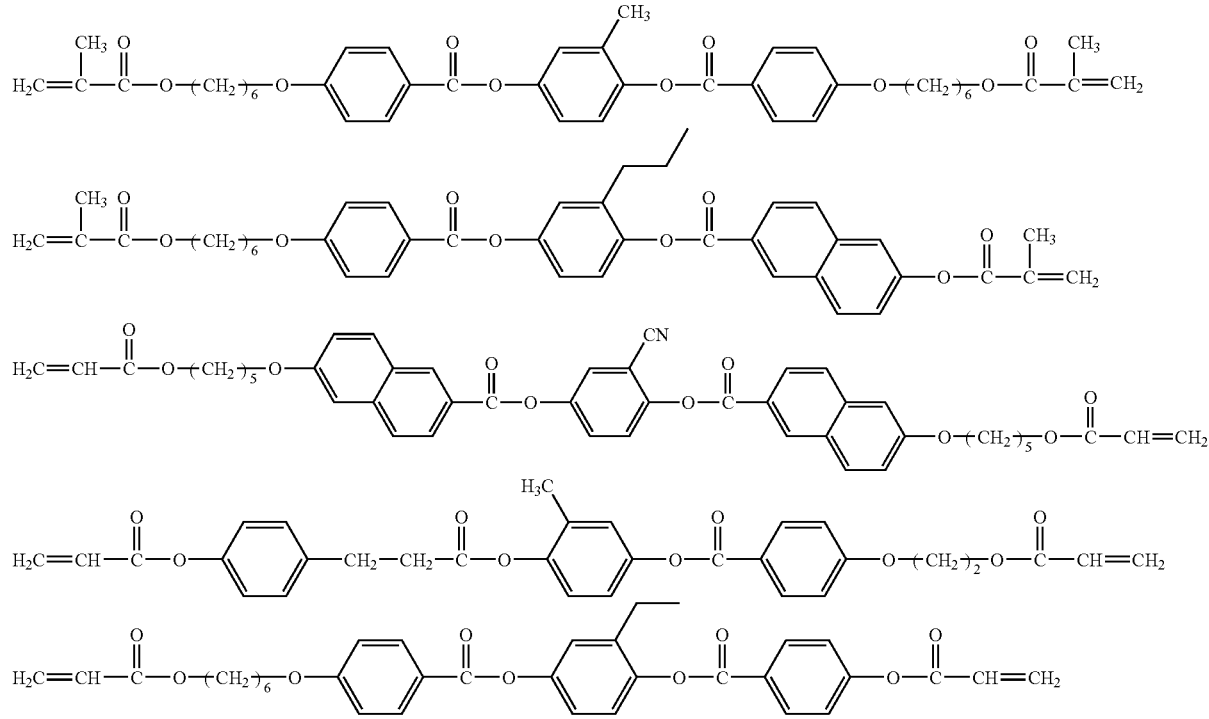

The monofunctional (meth)acrylate compounds represented by general formula (2) are exemplified by those represented by general formula (4):

[Formula 8]

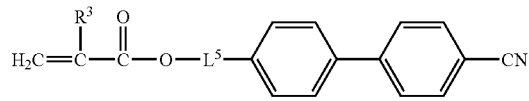

wherein $R^3$ and $L^5$ are as defined for general formula (2).

The compounds of general formula (4) are exemplified by compounds of [formula 9] shown below. Specific examples of the compounds of [formula 9] include, but are not limited to, compounds of [formula 10] and [formula 11] shown below.

[Formula 9]

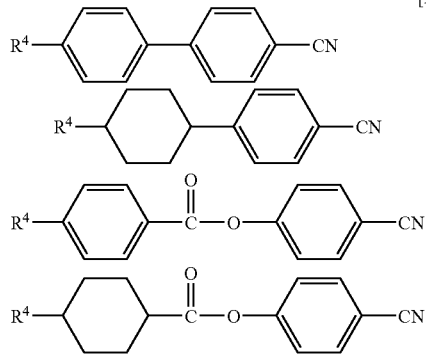

-continued

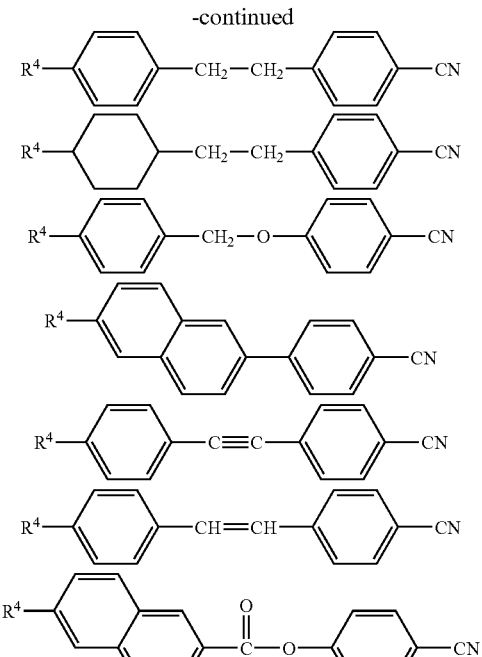

wherein R⁴ represents

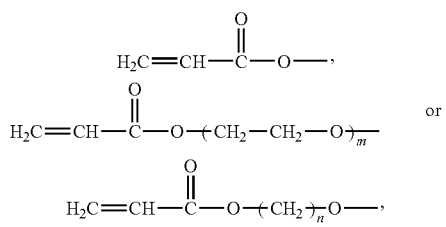

wherein n represents an integer of 2 to 8,
m represents an integer of 1 to 3.

The mass ratio of the bifunctional (meth)acrylate compound of general formula (1) to the monofunctional (meth) acrylate compound of general formula (2) (the former/the latter) is 90/10 to 40/60, preferably 85/15 to 50/50, more preferably 80/20 to 60/40. When the ratio is smaller than 40/60, the polymerizable composition suffers from the problems of crystallization, phase separation, and the like. When the ratio is greater than 90/10, it is difficult to control the alignment of the polymerizable composition.

The polymerizable composition of the invention may contain optional components hereinafter described in addition to the bifunctional (meth)acrylate compound of general formula (1) and the monofunctional (meth)acrylate compound of general formula (2). In such cases, the total content of the bifunctional (meth)acrylate compound of general formula (1) and

[Formula 10]

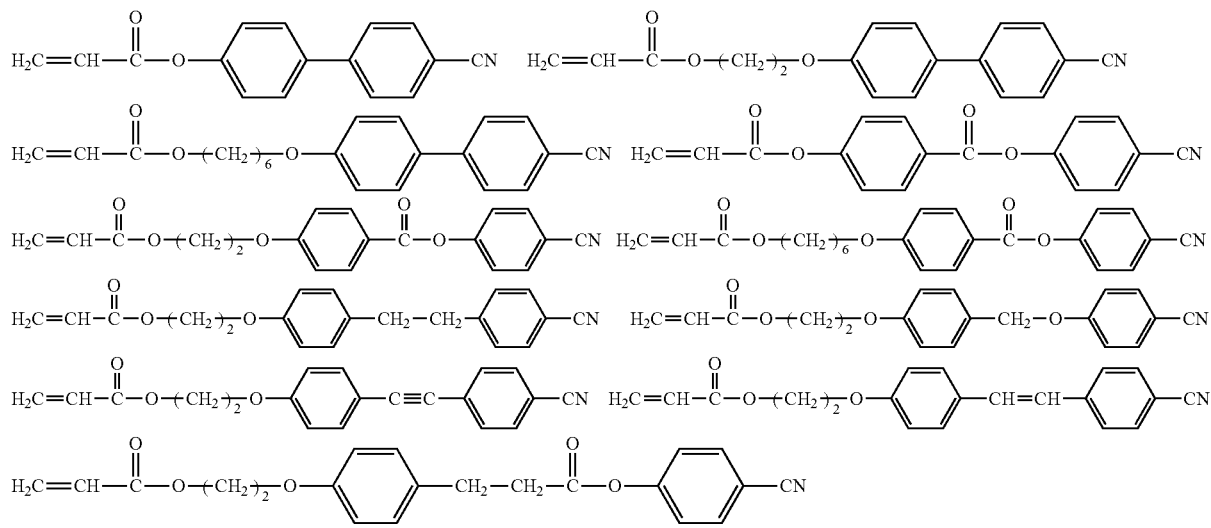

[Formula 11]

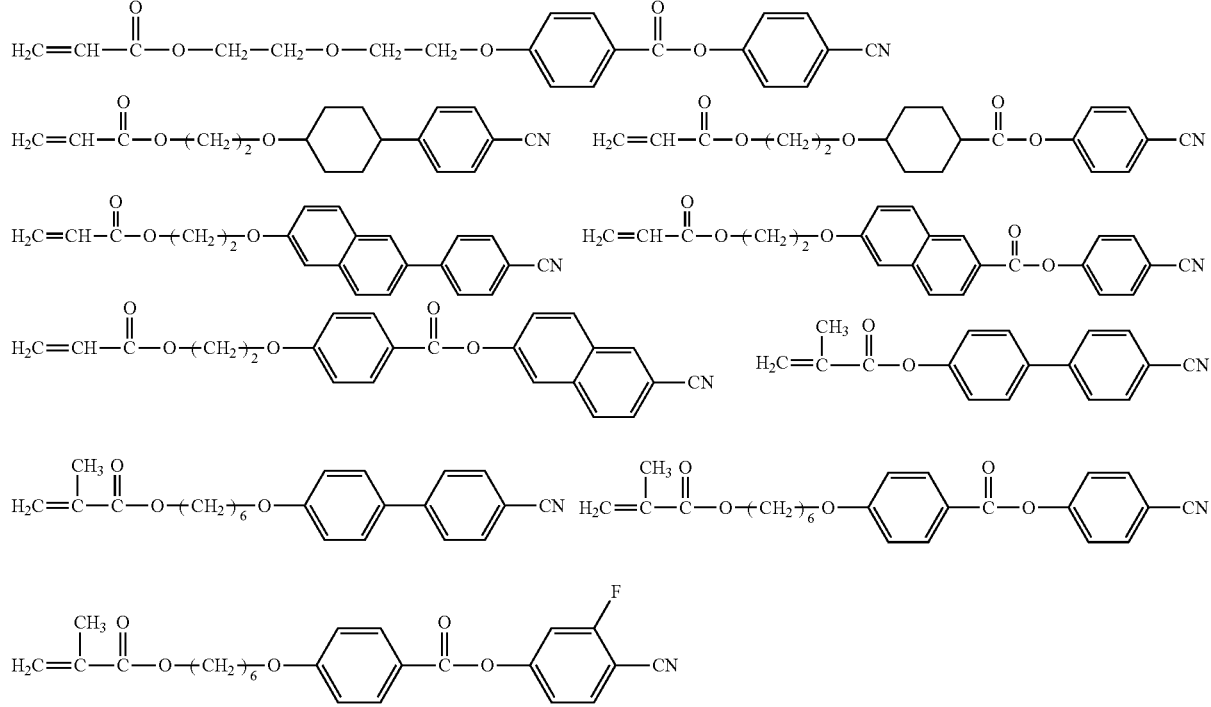

the monofunctional (meth)acrylate compound of general formula (2) in the polymerizable composition (except a solvent) is preferably at least 50% by mass, more preferably at least 70% by mass.

It is preferred for the polymerizable composition to exhibit a liquid crystal phase at least at or near room temperature, specifically at or below 30° C., more preferably at or below 15° C.

The polymerizable composition of the invention may be formulated together with a radical polymerization initiator and, if necessary, other monomer (a compound having an ethylenically unsaturated bond) into a solution in a solvent.

Examples of the other monomers include (meth)acrylic esters, such as methyl (meth)acrylate, ethyl (meth)acrylate, propyl (meth)acrylate, butyl (meth)acrylate, sec-butyl (meth)acrylate, tert-butyl (meth)acrylate, hexyl (meth)acrylate, 2-ethylhexyl (meth)acrylate, tetrahydrofurfuryl (meth)acrylate, glycidyl (meth)acrylate, allyl (meth)acrylate, allyloxy (meth)acrylate, cyclohexyl (meth)acrylate, benzyl (meth)acrylate, 1-phenylethyl (meth)acrylate, 2-phenylethyl (meth)acrylate, furfuryl (meth)acrylate, diphenylmethyl (meth)acrylate, naphthyl (meth)acrylate, pentachlorophenyl (meth)acrylate, 2-chloroethyl (meth)acrylate, methyl α-chloro (meth)acrylate, phenyl α-bromo(meth)acrylate, trifluoroethyl (meth)acrylate, tetrafluoropropyl (meth)acrylate, polyethylene glycol di(meth)acrylate, 1,4-butanediol di(meth)acrylate, 1,6-hexanediol di(meth)acrylate, trimethylolpropane tri(meth)acrylate, pentaerythritol tri(meth)acrylate, pentaerythritol tetra(meth)acrylate, dipentaerythritol penta(meth)acrylate, and dipentaerythritol hexa(meth)acrylate; diacetoneacrylamide, styrene, vinyltoluene, and divinylbenzene.

In order to secure heat resistance and optical characteristics of the polymer film obtained from the polymerizable composition, the content of the other monomers is preferably not more than 50 parts by mass, more preferably 30 parts by mass or less, per 100 parts by mass of the total of the bifunctional (meth)acrylate compound and the monofunctional (meth)acrylate compound.

Examples of the radical polymerization initiator include benzoyl peroxide, 2,2'-azobisisobutyronitrile, benzoin ethers, benzophenones, acetophenones, benzyl ketals, diaryl iodonium salts, triaryl sulfonium salts, diphenyl iodonium tetrafluoroborate, diphenyl iodonium hexafluorophosphonate, diphenyl iodonium hexafluoroarsenate, diphenyl iodonium tetra(pentafluorophenyl)borate, 4-methoxyphenyl phenyl iodonium tetrafluoroborate, 4-methoxyphenyl phenyl iodonium hexafluorophosphonate, 4-methoxyphenyl phenyl iodonium hexafluoroarsenate, bis(4-tert-butylphenyl)iodonium diphenyl iodonium tetrafluoroborate, bis(4-tert-butylphenyl)iodonium diphenyl iodonium hexafluoroarsenate, and bis(4-tert-butylphenyl)iodonium diphenyl iodonium trifluoromethanesulfonate, triphenyl sulfonium hexafluorophosphonate, triphenyl sulfonium hexafluoroarsenate, triphenyl sulfonium tetra(pentafluorophenyl)borate, 4-methoxyphenyl diphenyl sulfonium tetrafluoroborate, 4-methoxyphenyl diphenyl sulfonium hexafluorophosphonate, 4-methoxyphenyl diphenyl sulfonium hexafluoroarsenate, 4-methoxyphenyl diphenyl sulfonium trifluoromethanesulfonate, 4-methoxyphenyl diphenyl sulfonium triphenyl sulfonium tetra(pentafluorophenyl)borate, 4-phenylthiophenyl diphenyl sulfonium tetrafluoroborate, 4-phenylthiophenyl diphenyl sulfonium hexafluorophosphonate, 4-phenylthiophenyl diphenyl sulfonium hexafluoroarsenate; p-methoxyphenyl-2,4-bis(trichloromethyl)-s-triazine, 2-(p-butoxystyryl)-s-triazine, 2-(p-butoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzimidazole, benzyl dimethyl ketal, thioxanthone/amine, triarylsulfonium hexafluorophosphates, and bis(2,4,6-trimethylbenzoyl)phenylphosphine oxide.

A combination of the radical polymerization initiator and a sensitizer is also preferred. Examples of useful sensitizers are thioxanthone, phenothiazine, chlorothioxanthone, xanthone, anthracene, diphenylanthracene, and rubrene. The amount each of the radical polymerization initiator and/or the sensitizer, if added, is preferably 10% or less, more preferably 5% or less, even more preferably 0.5% to 3% parts, based on the polymerizable composition.

Examples of the solvent include benzene, toluene, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylformamide, chloroform, dichloromethane, carbon tetrachloride, dichloroethane, trichloroethylene, tetrachloroethylene, chlorobenzene, t-butyl alcohol, diacetone alcohol, glycerol, monoacetine, ethylene glycol, triethylene glycol, hexylene glycol, ethylene glycol monomethyl ether, ethyl cellosolve, and butyl cellosolve. The solvent may be a single compound or a mixture of compounds. A solvent having a boiling point of 60° to 250° C., particularly a solvent having a boiling point of 60° to 180° C. is preferred. A solvent whose boiling point is lower than 60° C. is liable to vaporize during application, resulting in thickness unevenness. A solvent whose boiling point is higher than 250° C. tends to remain even after solvent removal under reduced pressure or induce thermal polymerization when treated in high temperature, resulting in reduced aligning properties.

The polymerizable composition may further contain an optically active compound to provide a composition having inside a helical structure of the liquid crystal skeleton, namely, a cholesteric liquid crystal phase. In this embodiment, the amount of the optically active compound to be added is preferably 0.5% to 50%, more preferably 1% to 40%, by mass based on the polymerizable composition except the solvent. Examples of the active compounds include compounds of [formula 12] to [formula 15] shown below.

[Formula 12]

-continued
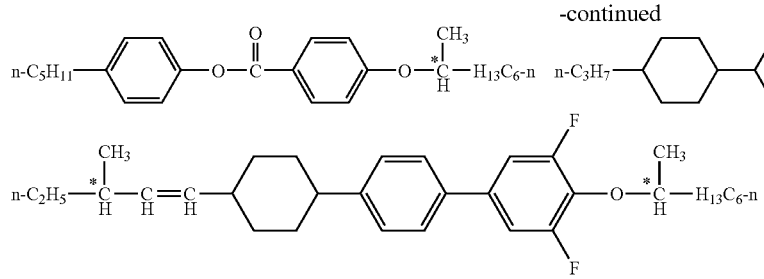
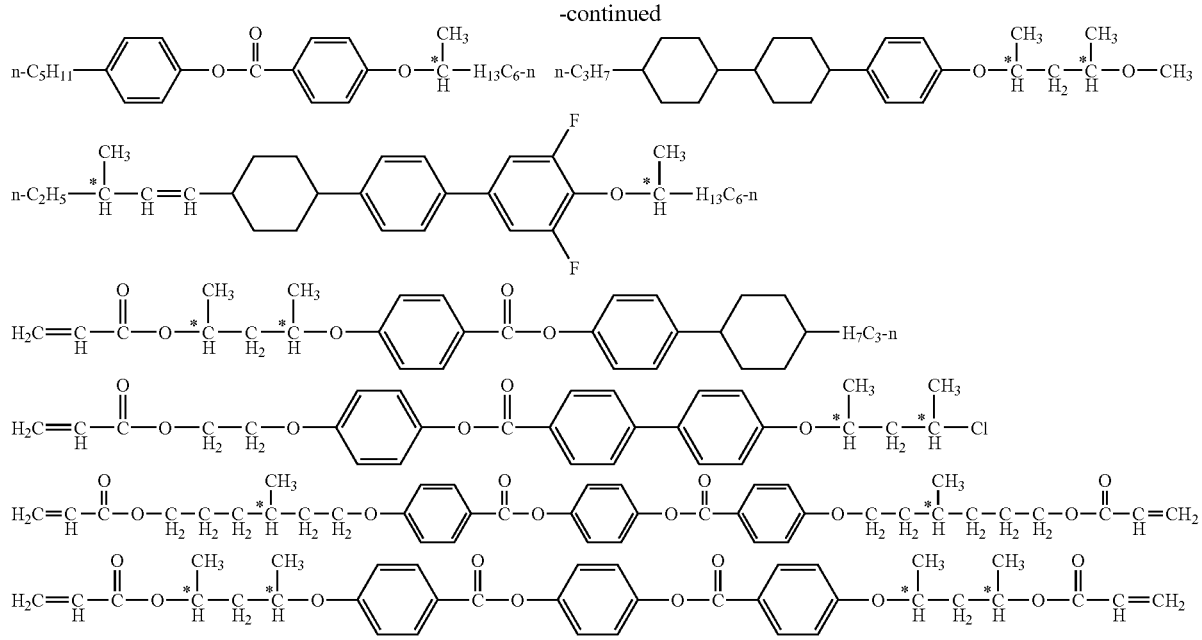
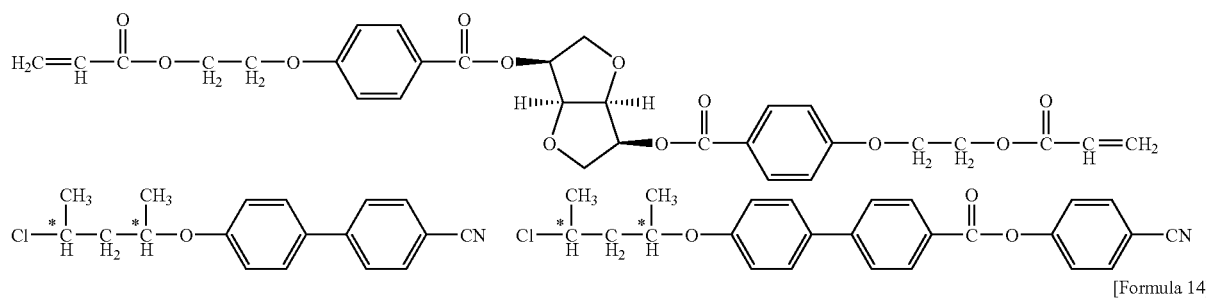
wherein Chol represents a cholesteryl group shown below.
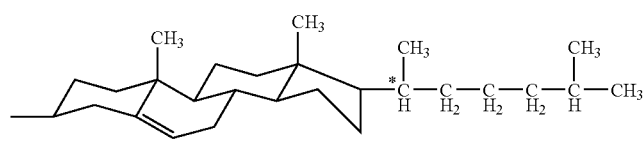
[Formula 15]
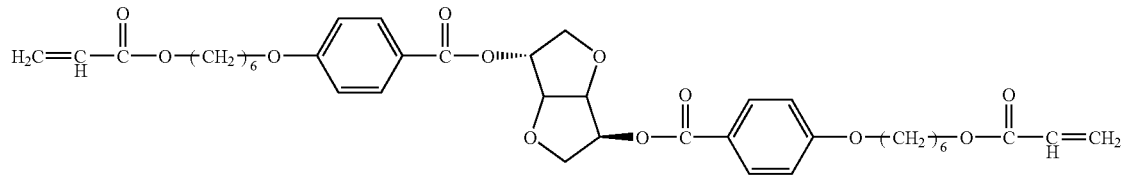

-continued

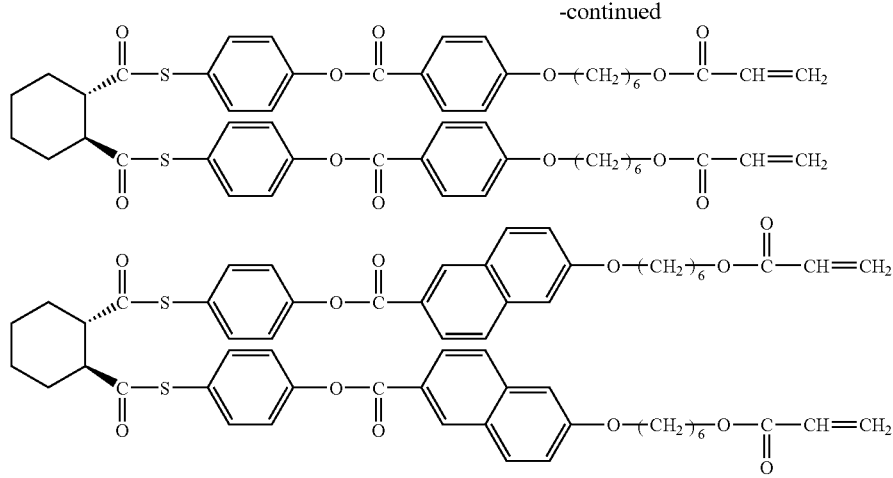

The polymerizable composition may further contain a surfactant that produces an excluded volume effect over the interface with air. The surfactant is preferably selected from those effective in facilitating applying the polymerizable composition to a substrate or controlling the alignment of the liquid crystal phase. Such surfactants include quaternary ammonium salts, alkylamine oxides, polyamine derivatives, polyoxyethylene-polyoxypropylene condensates, polyethylene glycol and esters thereof, sodium laurylsulfate, ammonium laurylsulfate, amine laurylsulfates, alkyl-substituted aromatic sulfonates, alkylphosphates, perfluoroalkylsulfonates, perfluoroalkylcarboxylates, perfluoroalkyl ethylene oxide adducts, and perfluoroalkyltrimethylammonium salts. A preferred amount of the surfactant to be used depends on the kind of the surfactant, the compounding ratio of the composition, and the like but generally ranges from 100 ppm to 5% by mass, more preferably 0.05% to 1% by mass, based on the polymerizable composition.

Additives may be added to the polymerizable composition where needed to improve characteristics of the polymerizable composition, including functional compounds, such as storage stabilizers, ultraviolet absorbers, infrared absorbers, antioxidants, fine particles of organic, inorganic or other materials, and polymers.

The storage stabilizers serve to improve storage stability of the liquid crystal composition, including hydroquinone, hydroquinone monoalkyl ethers, tert-butyl catechols, pyrogallols, thiophenols, nitro compounds, 2-naphtylamines, and 2-hydroxynaphthalenes. The amount of the storage stabilizer, if used, is preferably 1% by mass or less, more preferably 0.5% by mass or less, based on the polymerizable composition.

Any known antioxidants may be used, including hydroquinone, 2,6-di(tert-butyl)-p-cresol, 2,6-di(tert-butyl)phenol, triphenyl phosphite, and trialkyl phosphites.

Any known UV absorbers may be used, including salicylic ester compounds, benzophenol compounds, benzotriazole compounds, cyanoacrylate compounds, and nickel complex salt compounds.

The fine particles may be used to adjust the optical (refractive index, Δn) anisotropy or enhance the strength of the polymer film. The fine particles may be of inorganic, organic or metallic materials. The particle size is preferably 0.001 to 0.1 μm, more preferably 0.001 to 0.05 μm, to prevent flocculation. The particle size distribution is preferably narrow. The amount of the particles, if used, is preferably 0.1% to 30% by mass based on the polymerizable composition.

The inorganic materials include ceramics, fluorophlogopite, fluorotetrasilicic mica, taeiniolite, fluorovermiculite, fluorohectorite, hectorite, saponite, stevensite, montmorillonite, beidellite, kaolinite, fraipontite, ZnO, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$ and $Zr(OH)_4$. Fine particles having optical anisotropy exemplified by needle-like crystals of calcium carbonate have optical anisotropy. Such particles may be used to adjust the optical anisotropy of the polymer.

The organic materials include carbon nanotube, fullerene, dendrimer, polyvinyl alcohol, polymethacrylate, and polyimide.

The polymer as an additive may be added to adjust the electric characteristics or alignment characteristics of the polymer film. The polymer is preferably soluble in the above recited solvent. Examples of such a polymer include polyamide, polyurethane, polyurea, polyepoxide, polyester, and polyester polyol.

The polymer film of the present invention is obtained by dissolving the polymerizable composition in a solvent, applying the resulting solution to a substrate, removing the solvent from the coating film in which the liquid crystal molecules of the polymerizable composition have been aligned, and then irradiating the coating film with energy rays to cause polymerization.

Examples of preferred substrates include, but are not limited to, plates of glass, polyethylene terephthalate, polycarbonate, polyimide, polyamide, polymethyl methacrylate, polystyrene, polyvinyl chloride, polytetrafluoroethylene, cellulose, silicone, or calcite, and a reflector plate. It is preferred to use the above described substrate which has formed thereon a polyimide alignment layer or a polyvinyl alcohol alignment layer.

The polymerizable composition solution can be applied to the substrate by any known coating techniques including curtain coating, extrusion coating, roll coating, spin coating, dipping, bar coating, spraying, slide coating, printing, and casting. The thickness of the polymer film is decided as appropriate to the end use, and is preferably 0.05 to 10 μm.

The liquid crystal molecules in the polymerizable composition are aligned by, for example, previously subjecting the substrate to an alignment treatment. Such an alignment treatment of the substrate is preferably carried out by providing a liquid crystal alignment layer, such as a polyimide alignment layer or a polyvinyl alcohol alignment layer, on the substrate, followed by rubbing the alignment layer or a like operation. Molecular alignment may also be achieved by applying a magnetic field or an electric field to the coating film of the polymerizable composition on the substrate.

The polymerizable composition can be polymerized by known processes using light, heat, or electromagnetic waves. Light-induced polymerization (photopolymerization) reactions include radical polymerization, anionic polymerization, cationic polymerization, coordination polymerization, and living polymerization. Radical photopolymerization in the presence of the above described polymerization initiator is preferred. Taking the properties of the polymerizable groups into consideration, cationic polymerization is preferred. To obtain a polymer film with excellent alignment, cationic photopolymerization is more preferred. It is easy by cationic photopolymerization to effect polymerization under a condition in which the polymerizable composition exhibits a liquid crystal phase. Crosslinking reaction in a magnetic field or an electric field is also preferred. The liquid crystal (co)polymer formed on the substrate may be used as such or, when needed, stripped off the substrate or transferred onto a different substrate.

Examples of the light include ultraviolet light, visible light, and infrared light. Electromagnetic radiation, such as electron beams and X rays, may also be used. Usually, ultraviolet light or visible light is preferred. A preferred wavelength range is from 150 to 500 nm, more preferably from 250 to 450 nm, even more preferably 300 to 400 nm. Light sources include low pressure mercury lamps (e.g., bactericidal lamps, fluorescent chemical lamps, and black lights), high pressure discharge lamps (e.g., high pressure mercury lamps and metal halide lamps), and short arc discharge lamps (ultrahigh pressure mercury lamps, xenon lamps, and mercury xenon lamps), with ultrahigh pressure mercury lamps being preferred. The polymerizable composition may be irradiated with the light as emitted from a light source or a light ray of a specific wavelength or light rays of a specific wavelength range selected through a filter. A preferred irradiation energy density is 2 to 5000 mJ/cm$^2$, more preferably 10 to 3000 mJ/cm$^2$, even more preferably 100 to 2000 mJ/cm$^2$. A preferred illuminance is 0.1 to 5000 mW/cm$^2$, more preferably 1 to 2000 mW/cm$^2$. The temperature during irradiation may be decided so that the polymerizable composition may have a liquid crystal phase and is preferably 100° C. or lower. At temperatures higher than 100° C., thermal polymerization can occur, resulting in a failure to obtain satisfactory alignment.

The polymer film of the invention is useful as a molded article with optical anisotropy. Such a molded article finds use for optical compensation as, for example, a retardation film (e.g., a ½-wave plate or a ¼-wave plate), a polarizer, a dichroic polarizing plate, a liquid crystal alignment layer, an anti-reflective film, a selectively reflecting film, and a viewing angle compensation film. The molded article also finds use as an optical lens, such as a liquid crystal lens or a microlens, and an information recording material, such as a polymer dispersed liquid crystal (PDLC) type e-paper or a digital paper.

EXAMPLES

The present invention will now be illustrated in greater detail by way of Examples and Comparative Examples, but it should be understood that the invention is not deemed to be limited thereto.

Examples 1-1 to 1-4 and Comparative Examples 1-1 to 1-10

A polymer film was obtained in accordance with the following procedures: [1] preparation of polymerizable composition solution, [2] preparation of substrate, and [3] application to substrate.

[1] Preparation of Polymerizable Composition Solution

Each of polymerizable compositions having the formulation shown in Table 1 below and weighing 1.0 g was dissolved in 4 g of a solvent (cyclohexanone/2-butanone=1/1 by mass), and 0.03 g of a radical polymerization initiator (N-1919, from ADEKA Corp.) was added and completely dissolved therein. The solution was filtered through a filter with a pore size of 0.45 μm to prepare a polymerizable composition solution.

[2] Preparation of Substrate

A glass plate was cleaned with a mild detergent, rinsed with pure water, and dried. A 5% aqueous solution of polyvinyl alcohol was uniformly applied to the glass plate with a spin coater and dried at 100° C. for 3 minutes. The polyvinyl alcohol film thus formed on the substrate was rubbed with a rayon cloth in a given direction to prepare a substrate.

[3] Application to Substrate

The polymerizable composition solution prepared in [1] above was applied to the substrate prepared in [2] above with a spin coater. The speed and time of rotation of the spin coater were adjusted so as to give a coating film thickness of about 1.0 μm. The coating film was dried on a hot plate at 100° C. for 3 minutes, allowed to cool at room temperature for 5 minutes, and irradiated with light of a high pressure mercury lamp (120 W/cm) for 20 seconds to polymerize and cure to form a polymer film.

Evaluation of Polymer Film:

The polymer film thus obtained was evaluated as follows.

(1) Retardation (R)

The retardation (R) at 546 nm of the polymer film was determined by birefringence measurement in accordance with the Senarmont method using a polarizing microscope at room temperature (25° C.).

(2) Thickness (d)

The thickness (d) of the polymer film was measured with a contact stylus profilometer (Dektak6M from Ulvac Inc.) at room temperature (25° C.).

(3) Optical (Refractive Index) Anisotropy (Δn)

The optical (refractive index) anisotropy of the polymer film was calculated by replacing retardation (R) and thickness (d) in the following formula with the values measured above.

$$\text{Optical(refractive index)anisotropy}(\Delta n) = \text{retardation}(R)/\text{thickness}(d)$$

(4) Uniformity of Alignment

Uniformity of the polymer film was evaluated using a polarizing microscope.

A sample was mounted on the rotating stage between crossed polarizers, and the stage was rotated to observe the alignment state of the polymer film, from which the film uniformity was evaluated. A sample showing uniform alignment was rated "good", non-uniform alignment "medium", or no alignment due to, e.g., crystallization "bad".

(5) Stability of Film Formation

The polymerizable composition solution prepared in [1] above was applied using a spin coater and dried on a hot plate at 100° C. for 3 minutes. Immediately after the drying, the coating film was allowed to stand at room temperature (25° C.), and the stability of the liquid crystal state was observed with time. A film that maintained the liquid crystal state for more than 2 hours was rated "very good". A sample that initiated crystallization in a standing period after 1 hour and up to 2 hours was rated "good". A sample that initiated crystallization in a standing period after 30 minute and up to 1 hour was rated "medium". A sample that initiated crystallization within 30 minutes of standing was rated "bad".

Examples 2-1 and 2-2 and Comparative Examples 2-1 and 2-2

In the same manner as in Example 1, a polymer film was obtained from the polymerizable compositions of which the formulation is indicated in Table 2 and evaluated for film formation stability to confirm a suitable mixing ratio of the bifunctional (meth)acrylate compound and the monofunctional (meth)acrylate compound in the polymerizable composition of the invention. The results obtained are shown in Table 2. For reference, the results of evaluation of film formation stability in Example 1-3 and Comparative Example 1-5 are also shown in Table 2.

Example 3-1 and Comparative Examples 3-1 to 3-2

Each of the polymerizable compositions shown in Table 3 below, which were formulations developing a cholesteric liquid crystal phase, weighing 1.0 g was dissolved in 4 g of a solvent (2-butanone), and 0.03 g of a radical polymerization initiator (N-1919, from ADEKA Corp.) was added and completely dissolved therein. The solution was filtered through a filter with a pore size of 0.45 μm to prepare a polymerizable composition solution. The solution was uniformly applied to the substrate prepared in Example 1 with a spin coater. The coating film was dried on a hot plate at 100° C. for 3 minutes, allowed to cool at room temperature for 1 minute, and irradiated with light of a high pressure mercury lamp (120 W/cm) for 20 seconds to polymerize and cure to form a polymer film. The resulting polymer film was evaluated for selective reflection and film uniformity.

Compound Nos. 1 to 5 used in Examples and comparative compounds 1 to 4 used in Comparative Examples are shown below.

TABLE 1

| | | Example No. | | | | Comparative Example No. | | | | | | | | | |
|---|---|---|---|---|---|---|---|---|---|---|---|---|---|---|---|
| | | 1-1 | 1-2 | 1-3 | 1-4 | 1-1 | 1-2 | 1-3 | 1-4 | 1-5 | 1-6 | 1-7 | 1-8 | 1-9 | 1-10 |
| Formulation (mass %): | | | | | | | | | | | | | | | |
| Bifunctional Acrylate Compound | Comd. No. 1 | 75 | | | | 100 | | | | | | | | | |
| | Compd. No. 2 | | 75 | | | | 100 | 75 | 75 | | | | | | |
| | Compd. No. 3 | | | 75 | | | | | | 100 | 75 | 75 | | | |
| | Compd. No. 4 | | | | 75 | | | | | | | | 100 | | |
| | Compara. Compd. No. 1 | | | | | | | | | | | | | 75 | |
| | Compara. Compd. No. 2 | | | | | | | | | | | | | | 75 |
| Monofunctional Acrylate Compound | Compd. No. 5 | 25 | 25 | 25 | 25 | | | | | | | | | | |
| | Compara. Compd. No. 3 | | | | | | | 25 | | | 25 | | | | |
| | Compara. Compd. No. 4 | | | | | | | | 25 | | | 25 | | | |
| Physical Properties: | | | | | | | | | | | | | | | |
| Retardation (R) (nm) | | 215 | 203 | 279 | 291 | 191 | 182 | — | 164 | 276 | — | — | 285 | — | — |
| Thickness (d) (μm) | | 1.20 | 1.20 | 1.25 | 1.26 | 1.20 | 1.20 | — | 1.20 | 1.25 | — | — | 1.25 | — | — |
| Optical Anisotropy Δn | | 0.179 | 0.169 | 0.223 | 0.231 | 0.159 | 0.152 | — | 0.137 | 0.221 | — | — | 0.228 | — | — |
| Film Uniformity | | good | good | good | good | good | good | bad | medium | medium | bad | medium | good | bad | bad |
| Film Formation Stability | | good | very good | good | very good | medium | good | bad | medium | medium | bad | bad | good | bad | bad |

[Formula 16]

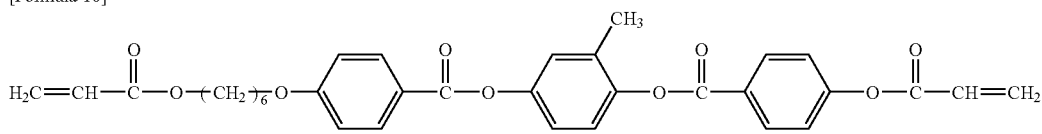

Compound No. 1

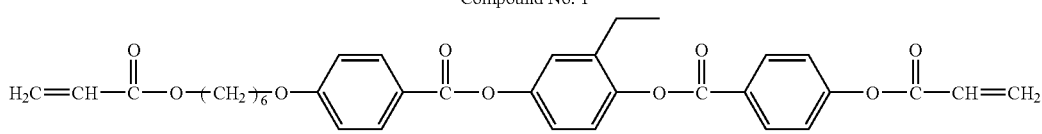

Compound No. 2

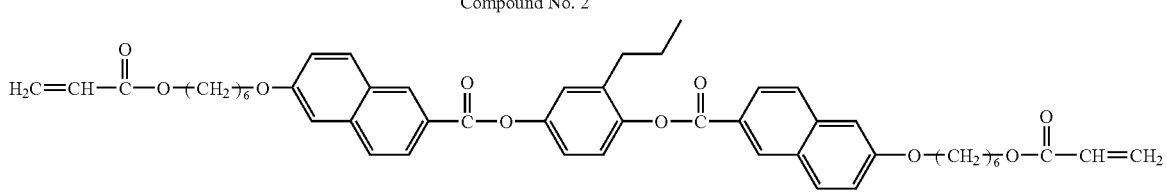

Compound No. 3

TABLE 1-continued

|  | Example No. | | | | Comparative Example No. | | | | | | | | | |
|---|---|---|---|---|---|---|---|---|---|---|---|---|---|---|
|  | 1-1 | 1-2 | 1-3 | 1-4 | 1-1 | 1-2 | 1-3 | 1-4 | 1-5 | 1-6 | 1-7 | 1-8 | 1-9 | 1-10 |

Compound No. 4

Compound No. 5

[Formula 17]

Comparative compound 1

Comparative compound 2

Comparative compound 3

Comparative compound 4

TABLE 2

|  | Example No. | | | Comparative Example No. | | |
|---|---|---|---|---|---|---|
|  | 1-3 | 2-1 | 2-2 | 1-5 | 2-1 | 2-2 |
| Formulation (mass %): | | | | | | |
| Compound No. 3 (bifunctional (meth)acrylate compound) | 75 | 90 | 40 | 100 | 95 | 30 |
| Compound No. 5 (monofunctional (meth)acrylate compound) | 25 | 10 | 60 |  | 5 | 70 |
| Physical Properties: | | | | | | |
| Film Formation Stability | good | good | good | medium | medium | medium |

TABLE 3

|  | Example 3-1 | Comparative Example No. 3-1 | Comparative Example No. 3-2 |
|---|---|---|---|
| Formulation (mass %): | | | |
| Compound No. 3 (bifunctional (meth)acrylate compound) | 65 | 65 | 90 |
| Compound No. 5 (monofunctional (meth)acrylate compound) | 25 | | |
| Comparative Compound 4 | | 25 | |
| Optically Active Compound*[1] | 10 | 10 | 10 |
| Physical Properties: | | | |
| Film Uniformity | good | medium (partly cloudy) | medium (partly cloudy) |
| λmax (nm) | 574 (yellowish green) | — | — |

*[1] Optically active compound

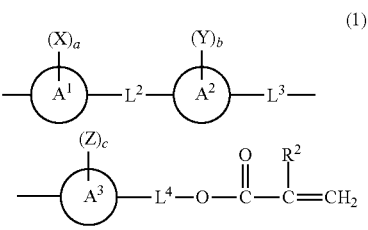

As can be seen from Table 1, whereas the polymer film obtained from the composition out of the scope of the present invention (Comparative Examples 1-1 through 1-10) was unsatisfactory in terms of film uniformity or film formation stability, the polymer film obtained from the composition of the invention (Examples 1-1 to 1-4), which contained a bifunctional (meth)acrylate compound having a side functional group and a cyanobiphenyl-containing monofunctional (meth)acrylate compound, exhibited excellent performance in alignment control, optical (refractive index) anisotropy (Δn), and liquid crystal phase stability at or near room temperature. It was thus confirmed that the specific effects are obtained only by the combination of specific liquid crystal compounds at the specific compounding ratio.

As can be seen from Table 2, whereas the polymer film obtained from the polymerizable composition out of the scope of the invention (Comparative Examples 1-5, 2-1, and 2-2) was unsatisfactory in liquid crystal phase stability at or near room temperature, the polymer film obtained from the composition of the invention (Examples 1-3, 2-1, and 2-2) exhibited good stability of liquid crystal phase at or near room temperature.

Table 3 shows the results of systems designed to develop a cholesteric liquid crystal phase. The polymer film obtained from the polymerizable composition of the invention (Example 3-1) was proved to have uniform quality and display selective reflection, whereas the polymer film obtained from the composition out of the scope of the invention (Comparative Examples 3-1 and 3-2) was cloudy due to nonuniform alignment of the liquid crystal molecules and did not display selective reflection.

INDUSTRIAL APPLICABILITY

The polymerizable composition of the invention stably exhibits a liquid crystal phase at and near room temperature and has high optical (refractive index) anisotropy (Δn) to provide sufficient optical characteristics even with a small thickness. The polymer film of the invention, which is obtained by photopolymerizing the polymerizable composition, exhibits highly uniform alignment and is useful as a liquid crystal substance with excellent optical characteristics.

The invention claimed is:

1. A polymerizable composition comprising a bifunctional (meth)acrylate compound represented by general formula (1):

[Formula 1]

$$H_2C=\underset{R^1}{C}-\underset{O}{\overset{O}{C}}-O-L^1-\underset{(Z)_c}{\overset{(X)_a}{A^1}}-L^2-\underset{}{\overset{(Y)_b}{A^2}}-L^3-\underset{}{\overset{}{A^3}}-L^4-O-\underset{O}{\overset{O}{C}}-\underset{R^2}{C}=CH_2 \quad (1)$$

wherein $R^1$ and $R^2$ each independently represent a hydrogen atom or a methyl group; ring $A^1$, ring $A^2$, and ring $A^3$ each independently represent a benzene ring, a cyclohexane ring, a cyclohexene ring, a naphthalene ring, a decahydronaphthalene ring, a tetrahydronaphthalene ring, or a phenanthrene ring, the —CH═ moiety of each of the rings being optionally displaced with —N═ or the —CH$_2$— moiety of each of the rings being optionally displaced with —S— or —O—; X, Y, and Z each independently represent an optionally substituted alkyl group having 1 to 8 carbon atoms, an optionally substituted acyl group having 1 to 8 carbon atoms, an optionally substituted alkoxy group having 1 to 8 carbon atoms, a halogen atom, or a cyano group, provided that at least one of Y's represents a group composed of at least two atoms except a halogen atom; $L^1$, $L^2$, $L^3$, and $L^4$ each independently represent a single bond, —COO—, —OCO—, —(CH$_2$)$_p$—, —CH=CH—, —(CH$_2$)$_p$O—, —O(CH$_2$)$_p$—, —CH=CHCH$_2$O—, —OCH$_2$CH=CH—, —C≡C—, —(CH$_2$)$_p$COO—, —OCO(CH$_2$)$_p$—, —(CH$_2$)$_p$OCO—O—, —OCO—O(CH$_2$)$_p$—, —(CH$_2$)$_q$O(CH$_2$)$_r$O—, or —O(CH$_2$)$_q$O(CH$_2$)$_r$—; a, b, and c each represent the number of the substituents on the rings A$^1$, A$^2$, and A$^3$, respectively, and are each defined to be an integer of 2t+2 or fewer, wherein t is the number of the 6-membered rings making up the monocyclic or fused ring A$^1$, A$^2$, or A$^3$, provided that b is at least 1; each p independently represents an integer of 1 to 8; and q and r each independently represent an integer of 1 to 3, and a monofunctional (meth)acrylate compound having a nitrile group at the terminal thereof represented by general formula (2):

[Formula 2]

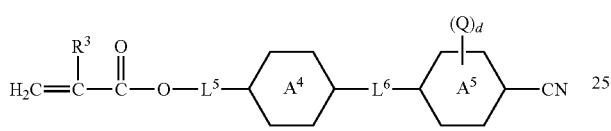

(2)

wherein R$^3$ represents a hydrogen atom or a methyl group; ring A$^4$ and ring A$^5$ each independently represent a benzene ring, a cyclohexane ring, or a naphthalene ring, the —CH= moiety of each of the rings being optionally displaced with —N= or the —CH$_2$— moiety of each of the rings being optionally displaced with —S— or —O—; each Q independently represents an optionally substituted alkyl group having 1 to 8 carbon atoms, an optionally substituted acyl group having 1 to 8 carbon atoms, an optionally substituted alkoxy group having 1 to 8 carbon atoms, a halogen atom, or a cyano group; L$^5$ and L$^6$ each independently represent —COO—, —OCO—, —(CH$_2$)$_p$—, —CH=CH—, —(CH$_2$)$_p$O—, —O(CH$_2$)$_p$—, —CH=CHCH$_2$O—, —OCH$_2$CH=CH—, —C≡C—, —(CH$_2$)$_p$COO—, —OCO(CH$_2$)$_p$—, —(CH$_2$)$_p$OCO—O—, —OCO—O(CH$_2$)$_p$—, —(CH$_2$)$_q$O(CH$_2$)$_r$O—, or —O(CH$_2$)$_q$O(CH$_2$)$_r$—; d represents the number of the substituents on the ring A$^5$ and is defined to be an integer of 2t+2 or fewer, wherein t is the number of the 6-membered rings making up the monocyclic or fused ring; each p independently represents an integer of 1 to 8; and q and r each represent an integer of 1 to 3, at a mass ratio of the former to the latter of 90/10 to 40/60.

2. The polymerizable composition according to claim 1, wherein the bifunctional (meth)acrylate compound represented by general formula (1) is a compound represented by general formula (3):

[Formula 3]

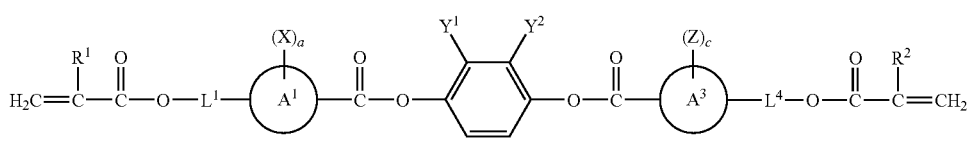

(3)

wherein R$^1$, R$^2$, L$^1$, L$^4$, A$^1$, A$^3$, X, Z, a, and c are as defined for general formula (1); and Y$^1$ and Y$^2$ each independently represent a hydrogen atom, an optionally substituted alkyl group having 1 to 8 carbon atoms, an optionally substituted acyl group having 1 to 8 carbon atoms, an optionally substituted alkoxy group having 1 to 8 carbon atoms, a halogen atom, or a cyano group, provided that at least one of Y$^1$ and Y$^2$ is a group composed of two or more atoms except a halogen atom bonded together.

3. The polymerizable composition according to claim 1, wherein the monofunctional (meth)acrylate compound represented by general formula (2) is a compound represented by general formula (4):

[Formula 4]

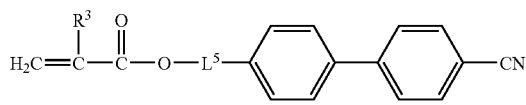

(4)

wherein R$^3$ and L$^5$ are as defined for general formula (2).

4. The polymerizable composition according to claim 2, wherein the ring A$^1$ and the ring A$^3$ in general formula (3) are each a benzene ring or a naphthalene ring.

5. The polymerizable composition according to claim 1, having a liquid crystal phase at 30° C. or lower.

6. The polymerizable composition according to claim 1, further comprising an optically active compound and having a cholesteric liquid crystal phase.

7. The polymerizable composition according to claim 1, further comprising a radical polymerization initiator and a surfactant.

8. A polymer film obtained by photopolymerizing the polymerizable composition according to claim 1 while the composition is in a liquid crystal phase.

9. An optical film for a display device, which is formed of the polymer film according to claim 8.

10. The polymerizable composition according to claim 3, wherein the ring A$^1$ and the ring A$^3$ in general formula (3) are each a benzene ring or a naphthalene ring.

11. The polymerizable composition according to claim 2, having a liquid crystal phase at 30° C. or lower.

12. The polymerizable composition according to claim 3, having a liquid crystal phase at 30° C. or lower.

13. The polymerizable composition according to claim 4, having a liquid crystal phase at 30° C. or lower.

14. The polymerizable composition according to claim 2, further comprising an optically active compound and having a cholesteric liquid crystal phase.

15. The polymerizable composition according to claim 3, further comprising an optically active compound and having a cholesteric liquid crystal phase.

16. The polymerizable composition according to claim 4, further comprising an optically active compound and having a cholesteric liquid crystal phase.

17. The polymerizable composition according to claim 5, further comprising an optically active compound and having a cholesteric liquid crystal phase.

18. The polymerizable composition according to claim 2, further comprising a radical polymerization initiator and a surfactant.

19. The polymerizable composition according to claim 3, further comprising a radical polymerization initiator and a surfactant.

20. The polymerizable composition according to claim 4, further comprising a radical polymerization initiator and a surfactant.

* * * * *